United States Patent Office

> 3,346,605
> Patented Oct. 10, 1967

3,346,605
AMMONIA COMPLEX MANGANESE SALT OF
ETHYLENEBISDITHIOCARBAMIC ACID
Hermann Windel, Frankenthal, Pfalz, and Ernst-Heinrich
Pommer, Ludwigshafen (Rhine), Germany, assignors to
Badische Anilin- & Soda-Fabrik Aktiengesellschaft,
Ludwigshafen (Rhine), Germany
No Drawing. Filed Aug. 21, 1962, Ser. No. 218,431
Claims priority, application Germany, Aug. 26, 1961,
B 63,793
1 Claim. (Cl. 260—429)

This invention relates to new manganese complex salts of ethylenebisdithiocarbamic acid. More specifically, it relates to a fungicidal ammonia complex manganese salt of ethylenebisdithiocarbamic acid.

It is known to use salts of ethylenebisdithiocarbamic acid for controlling fungi. The manganese salt, hereinafter referred to as "Maneb," has proved especially suitable in practice.

We have now found that the complex compounds of the manganese salt of ethylenebisdithiocarbamic acid with ammonia have a fungicidal activity which is superior to that of the non-complex salt. The composition of the complexes varies and depends on the manufacturing conditions. In general, the complex contains 4 to 9% ammonia. Deviations in content above and below this range have no appreciable effect on the fungicidal action.

The production of the manganese complex may advantageously be carried out by starting from a water-soluble salt of ethylenebisdithiocarbamic acid and reacting this with a water-soluble manganese salt in an aqueous solution of ammonia as the complex-forming compound. The composition of the complex depends on the concentration of ammonia as the complex-forming compound in the reaction mixture, the content of ammonia in the complex increasing with increasing concentration of aqueous ammonia in the reaction mixture. The following specification illustrates the production of the new compound.

A solution of 246 parts (by weight) ammonium ethylenebisdithiocarbamate in 2000 parts water is mixed with 136 parts 25% aqueous ammonia. This solution is allowed to flow into 1000 parts water together with a solution of 169 parts manganese sulfate (containing 1 mole water of crystallization per mole manganese sulfate) in 2000 parts water. The temperature is maintained at 40° C. and the whole stirred for half an hour. The precipitate formed is filtered off with suction, washed with water and dried at 40° C. The yield is 91% of the theory.

It is advantageous to use the Maneb complexes in admixture with other organic fungicidal substances, preferably one or more thiuram disulfides. The mixtures may be prepared by various methods. For example, one or more thiuram disulfides may be mechanically mixed with the complex compounds. The mixtures may however also be prepared chemically by reacting only part of the ethylenebisdithiocarbamic acid in an aqueous solution of ammonia with a manganese compound to form the complex manganese salt and oxidizing the remainder to the thiuram disulfide (PETD). The sequence of the steps is optional. The oxidation may be carried out with conventional oxidizing agents, for example, hydrogen peroxide or alkali nitrite and acid. The mixtures have a good fungicidal action which is superior to that of the individual components, even if they contain only small amounts of the complex compound or PETD.

Mixtures with one or more thiuram disulfides may be used, for example, with the following thiuram disulfides: Tetramethylthiuram disulfides (TMTD), dipyrrolidylthiuram disulfide (DPTD) or the thiuram disulfide of ethylenebisdithiocarbamic acid (PETD).

In addition to Maneb complexes, the mixture may contain other difficulty water-soluble salts of identical or different dithiocarbamic acids, for example, salts of zinc, manganese, iron, nickel and copper and, for example, the salts of dimethyldithiocarbamic acid, tetraethyldithiocarbamic acid or ethylenebisdithiocarbamic acid. The fungicides according to this invention may thus contain mixtures of salts of different metals and/or different dithiocarbamic acids.

Production is advantageously effected by converting simultaneously or in any sequence a water-soluble salt of ethylenebisdithiocarbamic acid or a mixture of salts of different dithiocarbamic acids containing at least one such salt into a complex compound of the manganese salt of ethylenebisdithiocarbamic acid with ammonia or a mixture of different dithiocarbamates containing at least one such salt and the thiuram disulfide of ethylenebisdithiocarbamic acid (PETD) or a mixture of different thiuram disulfides containing this thiuram disulfide.

A chemical method of preparing a mixture is as follows:

A mixture of 24 parts hydrogen peroxide 35% and 24 parts concentrated sulfuric acid in 200 parts water is added dropwise at 0 to 10° C. while stirring to a solution of 246 parts (by weight) ammonium ethylenebisdithiocarbamate in 2000 parts water. After 15 minutes, 125 parts 25% aqueous ammonia is added and a solution of 128 parts manganese sulfate (1 mole water of crystallization per mole of manganese sulfate) in 1000 parts water is allowed to flow in. The whole is stirred for half an hour and the precipitate filtered off with suction, washed with water and dried at 40° C. The yield is 86% of the theory.

The new compounds are suitable for controlling fungi. For this purpose, the objects to be protected against fungus attack, e.g., parts of plants, leaves, fruits or stems with a fungitoxic amount of the new active substances. The active substances may be applied, for example, in the form of dusting powders, dispersions or wettable powders which may be prepared using the conventional auxiliaries.

The following example shows the good activity of the agents according to the invention.

EXAMPLE

Leaves of pot vines of the variety Müller-Thurgau are sprayed with aqueous dispersions of finely ground formulations of 80% active substance and 20% sodium lignin sulfonate. After the sprayed-on coating has dried, the leaves are infected with a zoospore suspension of *Plasmopora viticola* (vine Peronospora). The plants are first placed in a chamber saturated with water vapor for sixteen hours at 20° C. and then for eight days in a green-house at temperatures between 20° and 30° C. After this period the plants are again placed for sixteen hours in the moist chamber to accelerate and intensify the ejection of the sporangiophores. The spore patches on the underside of the leaves are then counted. Untreated control plants serve as a comparison. Damage to the vine leaves is not observed in these experiments.

*Inhibition values with respect to grape Peronospora*

| Active substance | Percentage of attacked leaves after spraying with liquor of the percentage concentration | | |
|---|---|---|---|
| | 0.05 | 0.025 | 0.01 |
| Maneb | 1 | 6.5 | 38 |
| Maneb ammonia complex | 0 | 4 | 31 |
| Maneb ammonia complex:PETD ratio 80:20 | 0 | 0.5 | 18 |
| PETD | 5 | 12 | 45 |
| Control (untreated) | | 100 | |

We claim:

A complex manganese salt of ethylenebisdithiocarbamic acid with ammonia, said complex salt having an ammonia content of about 4 to 9%.

References Cited

UNITED STATES PATENTS

| 1,826,065 | 10/1931 | Fulton et al. | 167—22 |
| 2,520,280 | 8/1950 | Harman | 260—429 |
| 2,575,098 | 11/1951 | Crawford et al. | 167—22 |
| 2,696,492 | 12/1954 | Butler | 260—429 |
| 2,855,418 | 10/1958 | Mugnier | 260—429 |
| 2,974,156 | 3/1961 | Sobatzki | 260—429 |

FOREIGN PATENTS 217,475   10/1961   Austria.

TOBIAS E. LEVOW, *Primary Examiner.*

JULIAN S. LEVITT, *Examiner.*

G. A. MENTIS, D. DEMERS, *Assistant Examiners.*